US007909000B1

(12) United States Patent
O'Neill et al.

(10) Patent No.: US 7,909,000 B1
(45) Date of Patent: Mar. 22, 2011

(54) UNIVERSAL PANEL MEMBER FOR FORMING FEEDER ASSEMBLIES

(75) Inventors: Edward J. O'Neill, Emmitsburg, MD (US); Bryan R. Saylor, Frederick, MD (US)

(73) Assignee: Horse Safe Products, LLC, Rocky Ridge, MD (US)

( * ) Notice: Subject to any disclaimer, the term of this patent is extended or adjusted under 35 U.S.C. 154(b) by 155 days.

(21) Appl. No.: 12/339,138

(22) Filed: Dec. 19, 2008

Related U.S. Application Data (60) Provisional application No. 61/016,583, filed on Dec. 25, 2007.

(51) Int. Cl.
*A01K 5/01* (2006.01)
(52) U.S. Cl. ...................................... 119/61.1; 220/4.33
(58) Field of Classification Search ............... 119/58, 119/61.56, 61.1, 61.2, 61.3; 220/4.28, 4.29, 220/4.33, 592.27, 592.2, 62.18, 62.22; 222/92–107; D30/108, 113, 129, 131–133, 161, 199; 446/7, 446/478, 112, 122, 487
See application file for complete search history.

(56) References Cited

U.S. PATENT DOCUMENTS

| | | | | |
|---|---|---|---|---|
| 3,410,441 A * | 11/1968 | Rhyne | ............ | 220/4.28 |
| 3,857,342 A * | 12/1974 | Johns | ............ | 108/53.3 |
| 4,083,464 A * | 4/1978 | Burnett | ............ | 217/13 |
| 4,171,058 A * | 10/1979 | Collins | ............ | 217/12 R |
| 4,561,554 A * | 12/1985 | Swincicki | ............ | 220/4.28 |
| 4,867,327 A * | 9/1989 | Roland | ............ | 217/12 R |
| 4,917,255 A * | 4/1990 | Foy et al. | ............ | 220/6 |
| 5,236,099 A * | 8/1993 | Fties et al. | ............ | 220/4.31 |
| 5,275,302 A * | 1/1994 | Uitz | ............ | 220/4.28 |
| 5,597,084 A * | 1/1997 | Parasin | ............ | 220/4.28 |
| 5,797,508 A * | 8/1998 | Loftus et al. | ............ | 220/6 |
| 6,631,821 B2 * | 10/2003 | Vourganas | ............ | 220/1.5 |
| 6,776,300 B2 * | 8/2004 | Walsh et al. | ............ | 220/6 |
| 7,478,734 B2 * | 1/2009 | Vargas | ............ | 220/4.34 |
| 2004/0124191 A1 * | 7/2004 | Colladon | ............ | 220/4.01 |

* cited by examiner

*Primary Examiner* — Rob Swiatek
*Assistant Examiner* — Ebony Evans
(74) *Attorney, Agent, or Firm* — Miller Law Group, PLLC (57) ABSTRACT

A universal panel member can be connected with other universal panel members to form various sizes and shapes of feeder structures for dispensing forage material to horses and other animals. The universal panel members can be assembled to provide a floor with ground engaging legs and an upright wall surrounding the floor into which forage material can be placed for access by the animals feeding therefrom. Each panel member is formed with a main body portion that has a pair of connecting legs projecting outwardly from two opposing sides of the body portion within the same plane as the body portion, and a pair of connecting legs that project from the other two opposing sides perpendicularly to the plane of the body portion. Proper location of openings through the body portion allows the connecting legs of adjoining panel members to be connected with fasteners to form feeder structures.

19 Claims, 13 Drawing Sheets

UNIVERSAL PANEL MEMBER FOR FORMING FEEDER ASSEMBLIES

CROSS-REFERENCE TO RELATED APPLICATIONS

This application claims domestic priority on U.S. Provisional Patent Application Ser. No. 61/016,583, filed on Dec. 25, 2007, and entitled "Universal Panel Member for Forming Feeder Assemblies", the content of which is incorporated herein by reference.

FIELD OF THE INVENTION

The present invention is directed to feeders for use in dispensing hay and other forage crop material as a food source to animals in the field and, more particularly, to a panel member that can be used to form different embodiments of a feeder assembly.

BACKGROUND OF THE INVENTION

Round hay bales are typically formed in a cylindrical shape and weigh more than 1000 pounds. As a result, round hay bales are normally transported by tractors or skid steer loaders on spear-like carriers designed to impale the end of the cylindrical bale. Dispensing the hay to the animals is often the process of dropping the round bale on the ground in an open area for access by the animals to be fed. Such a feeding process exposes the hay to contamination from ground moisture, the weather, animal wastes and dirt. Furthermore, the hay can become a marking territory for the dominant horses and bedding material for others. Accordingly, this feeding process generally wastes up to 50% of the hay with respect to being available for feed for the animals. Therefore, feeding animals in the open range or pasture by dropping the round hay bale on the ground increases feeding costs. Furthermore, since a round bale of hay under these conditions is not likely to last for four days for four horses during the winter, increased costs of transporting additional round bales also adds to the cost of feeding hay to the animals.

Most round bale feeders that are commercially available are designed to minimize the waste issues associated with the dropping of the round bale onto the ground, but are more generalized for use by stock farm animals and are not particularly well adapted for use by horses. Horses are herd animals that instinctively rely on large numbers for safety. Horses are easily spooked and move quickly when startled by noise, smells, strong winds and even other dominant horses. Injuries to horses are often self-imposed when yielding to more dominant horses. When near feeders that have sharp edges or protrusions, horses often jump without looking and land hard on the edges or protrusions and receive corresponding injuries. Furthermore, horse can become entangled in conventional hay feeders when attempting to jump over the feeder to avoid being kicked or bitten by other more dominant horses.

Forage crop materials, other than round bales of hay, can also be provided to animals as a food source in the field. Examples of such other forms of forage crop material include large rectangular bales of hay, small and medium sized rectangular bales of hay, loose hay and straw. Large bales of hay, like the large round bales, require mechanization to handle the bales from formation to placement for access by the animals. Rectangular hay bales are typically formed more densely than round bales and usually require the binders (whether wire or twine) to be removed to allow the animals to access the material in order to be able to eat it. Once the binder devices have been removed from the rectangular bales of hay, the integrity of the bale disintegrates and needs to be contained in some manner to minimize loss before the animals can eat the material.

Accordingly, it would be desirable to provide a feeder apparatus that could be utilized in the feeding of different packaging of hay by depositing the bales onto the feeder apparatus to provide proper access to the material by the animals. Such feeders will be desired in many different configurations depending on the particular packaging of the hay being dispensed and the amount of hay to be provided. Accordingly, it would be desirable to provide a panel member that could be utilized to form all of the different feeder apparatus configurations.

SUMMARY OF THE INVENTION

It is an object of this invention to overcome the disadvantages of the prior art by providing a universal panel member that can be joined with other panel members to form a feeder for presenting forage material to animals.

It is another object of this invention to provide a universal panel member that is configured to be connectable to other universal panel members of like configuration in several different orientations.

It is a feature of this invention that the universal panel member is formed with outwardly protruding insertion members that are engagable with corresponding insertion slots to connect two universal panel members together in an orthogonal relationship.

It is an advantage of this invention that the insertion members protrude from opposing sides of a body portion of the universal panel member.

It is another feature of this invention that the universal panel member is formed with connection members that protrude perpendicularly from the body portion to be connectable by fasteners with openings formed in other universal panel members to form structures therefrom.

It is another advantage of this invention that the universal panel member is configured to be connectable with other correspondingly configured universal panel members to for variously sized feeder structures.

It is still another advantage of this invention that feeder structures formed from the universal panel members can be configured to conform to the purpose desired for the feeder structure.

It is still another feature of this invention that the universal panel member is formed with legs configured to project from the main body portion of the panel member in two orthogonal directions, and with openings in the main body portion that would be aligned with corresponding legs from another universal panel member to permit fasteners to connect one panel member to another.

It is yet another advantage of this invention that the connecting legs projecting from the main body portion have a length that is greater than the thickness of the main body portion.

It is yet another feature of this invention that feeder structures assembled from the universal panel members can have selected ones of the panel members turned so that the connecting legs oriented orthogonally to the main body portion can be used as support legs for the feeder structure, while the main body portions become the floor member of the feeder structure.

It is still another advantage of this invention that the feeder structures formed by assembling universal panel members will keep forage material for animals from resting on the ground.

It is still another feature of this invention that the universal panel member is designed to be formed from plastic through rotational molding into a double-walled configuration that provides a safe feeder structure for horses and other animals to obtain forage material therefrom.

It is yet another object of this invention to provide a universal panel member for the formation of feeder structures that are durable in construction, inexpensive of manufacture, carefree of maintenance, facile in assemblage, and simple and effective in use.

These and other objects, features and advantages are accomplished according to the instant invention by providing a universal panel member that is designed to be connected with other universal panel members to form various sizes and shapes of feeder structures for dispensing forage material to horses and other animals. The universal panel members can be assembled to provide a floor with ground engaging legs and an upright wall surrounding the floor into which forage material can be placed for access by the animals feeding therefrom. Each panel member is formed with a main body portion that has a pair of connecting legs projecting outwardly from two opposing sides of the body portion within the same plane as the body portion, and a pair of connecting legs that project from the other two opposing sides perpendicularly to the plane of the body portion. Proper location of openings through the body portion allows the connecting legs of adjoining panel members to be connected with fasteners to form feeder structures.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring to FIGS. 1-7, a panel member incorporating the principles of the instant invention can best be seen. The panel member 10 is configured to permit a joinder of several of the panel members 10 to form a selected configuration of a feeder assembly, as will be described in greater detail below. Each panel member 10 is preferably formed from plastic through rotational molding, or a similar process that forms the panel member 10 in a double wall construction to provide a lightweight panel member 10 that is generally hollow and can be lifted and manipulated by a single person. The thickness of the walls will preferably be approximately 3 mills, which will provide adequate strength and durability for the panel member. The overall dimensions of the panel member 10 are preferably about 36 inches by 36 inches, with an overall thickness of about 1.5 inches, but these dimensions can be established to correspond to the size of the feeder assembly to be constructed from the panel members 10. For example, a panel that has an overall dimension of 48 inches by 48 inches would provide a larger feeder panel with the same number of panel members 10.

Figure 1:
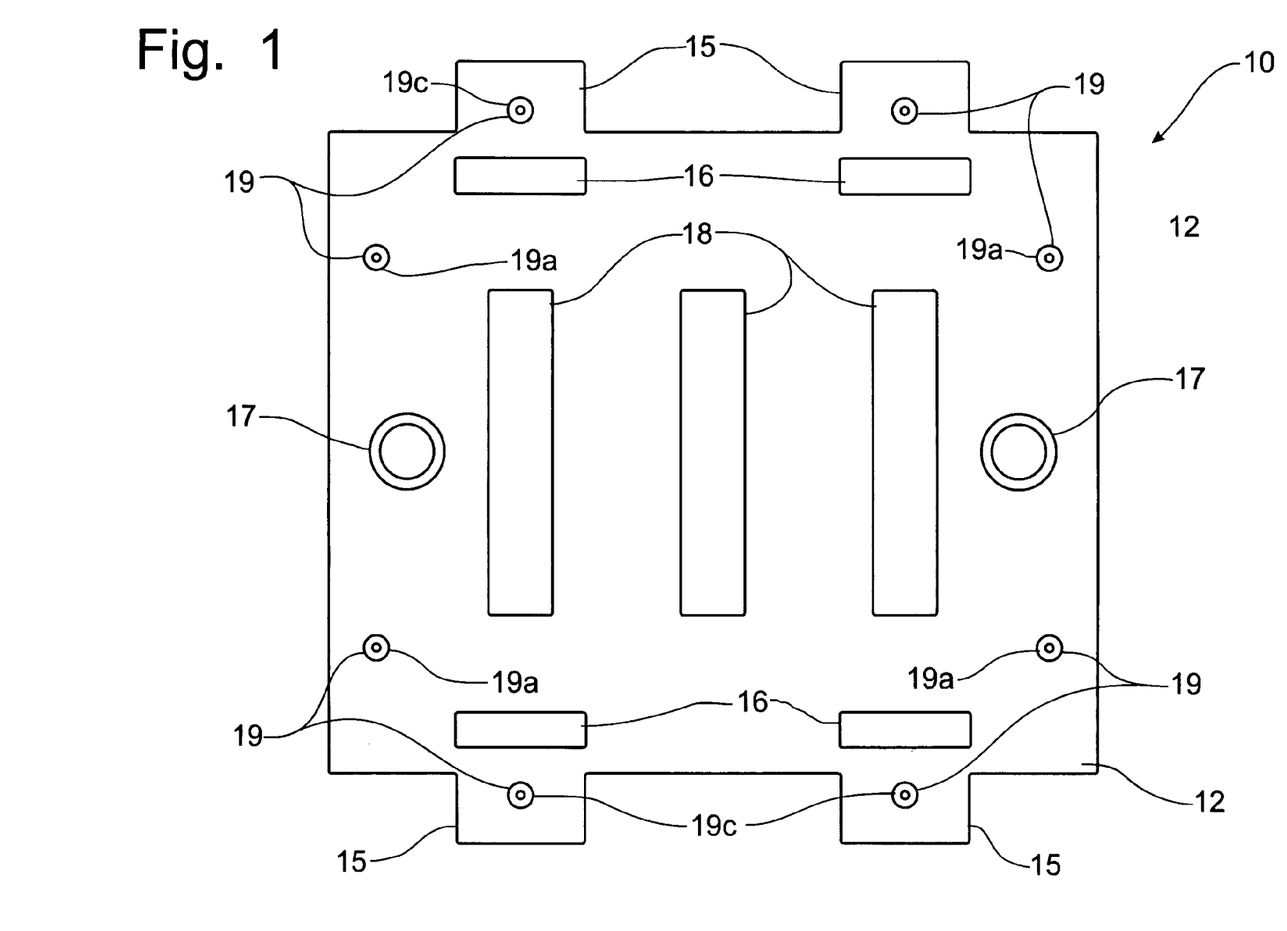
FIG. 1 is a plan view of a planar first side of the panel member.
Figure 2:
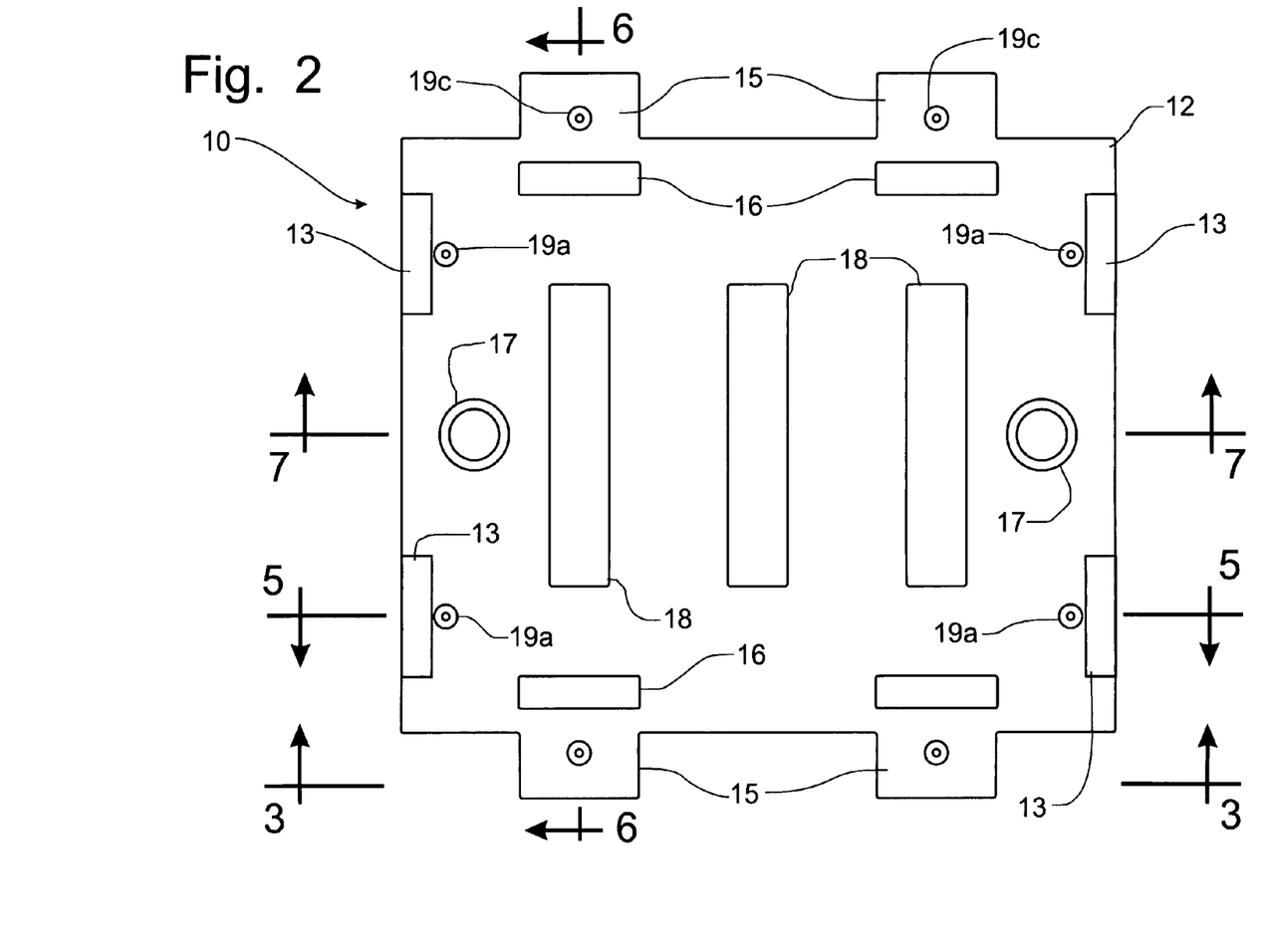
FIG. 2 is a plan view of a second side of the panel member opposing the first side shown in FIG. 1.
Figure 3:
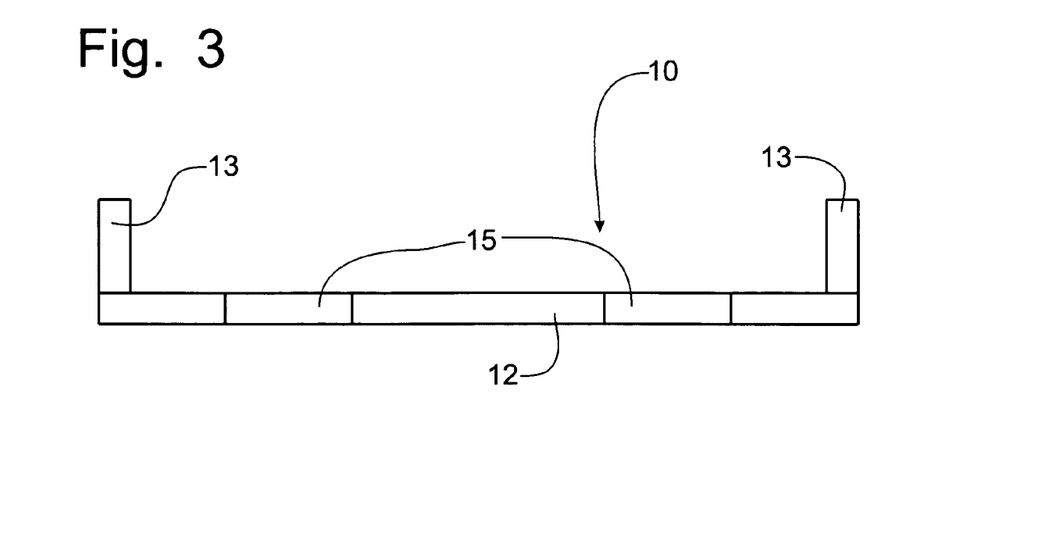
FIG. 3 is a side elevational view of the panel member corresponding to lines 3-3 of FIG. 2.
Figure 4:
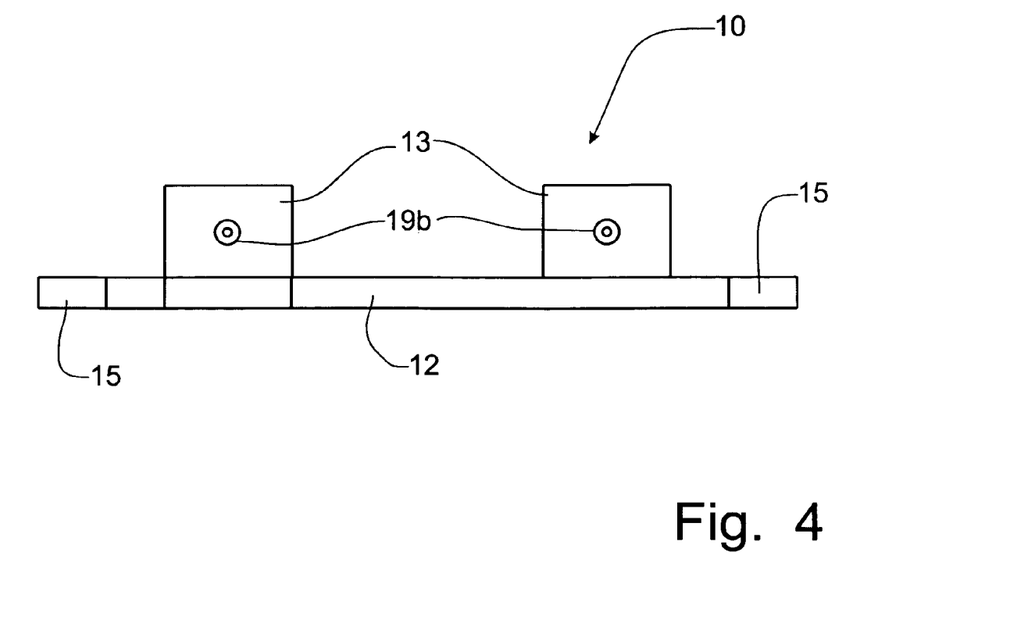
FIG. 4 is a side elevational view of the panel member taken orthogonally to the side elevational view of FIG. 3.

The panel member 10 has a generally planar side shown in FIG. 1, and an opposing side that incorporates opposing pairs of orthogonally projecting connection members 13, as is depicted in FIG. 2. As can be seen in FIGS. 1 and 2, the opposing faces of the panel member 10 are each symmetrical about each of the vertical and horizontal centerlines. Two of the opposing sides of the panel member 10 are each formed with a pair of laterally spaced insertion members 15 that are oriented in the plane of the body portion 12 of the panel member 10. Inwardly from each insertion member 15 is an insertion slot 16 sized to receive one of the insertion members 15 from another panel member 10. Accordingly, each panel member 10 is formed with four insertions members 15 and four insertion slots 16, along with four connection members 13 projecting outwardly from the plane of the body portion 12.

Figure 7:
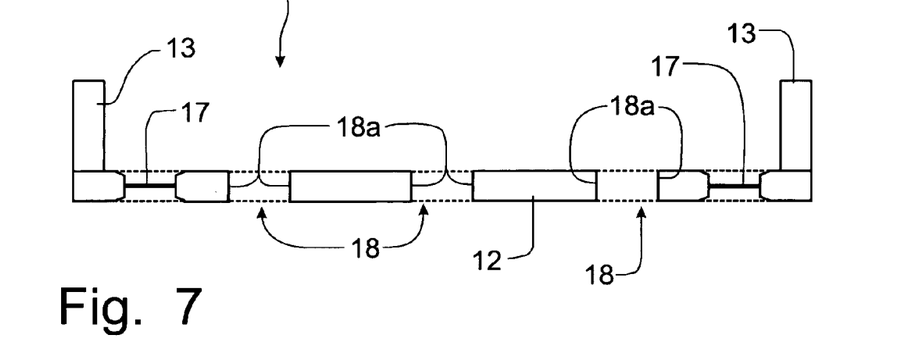
FIG. 7 is a cross-sectional view of the panel member taken through the center of the panel member corresponding to lines 7-7 of FIG. 2.

To strengthen the body portion 12, the panel member 10 is preferably formed with at least one, and preferably several, slotted rectangular openings 18 that extend through the body portion 12 but include side walls 18a that span from one side of the body portion 12 to the other, as is reflected best in FIG. 7. Optionally, the body portion 12 could also incorporate kiss-offs 17 that could be appropriately located to strengthen the body portion 12. The slotted rectangular openings 18 can be formed in different configurations but are intended to strengthen the interior of the body portion 12 through the use of the side walls 18a and to lighten the weight of the panel member 10 by eliminating material that would otherwise be located where the openings 18 are formed.

The panel member 10 is also formed with a plurality of openings 19 for the insertion of fasteners (not shown) in a manner to connect one panel member 10 to another, as will be described in greater detail below. Some of the fastener openings 19a are arranged in the body portion 12 to be alignable with corresponding openings 19b in the connection members 13 so that a fastener (not shown) will be able to interconnect aligned openings 19a, 19b. Fastener openings 19c are located in the insertion members 15 to permit adjoining insertion members 15 to be interconnected by a U-bolt (not shown) in certain configurations of feeder assemblies, as will be described in greater detail below. The fastener openings 19c in the insertion members 15 can also be use to receive a stop member (not shown) that can extend above the insertion members 15 when placed through an insertion slot 16 to prevent the insertion member 15 from withdrawing from the insertion slot 16.

Figure 5:
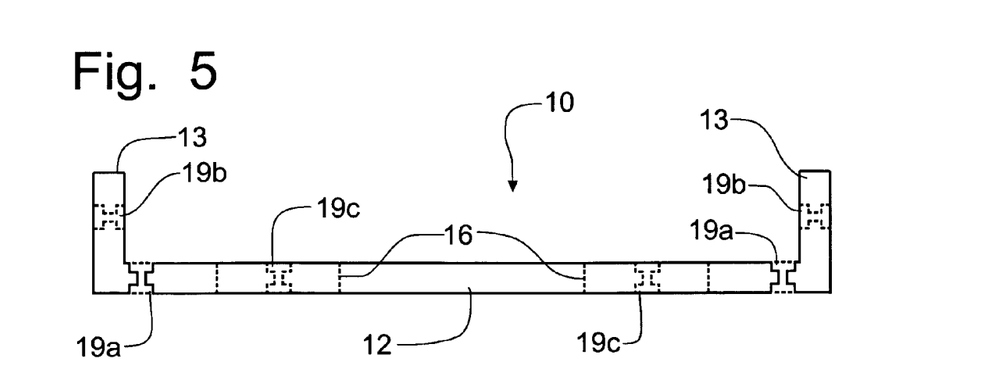
FIG. 5 is a cross-sectional view of the panel member taken along lines 5-5 in FIG. 2.
Figure 6:
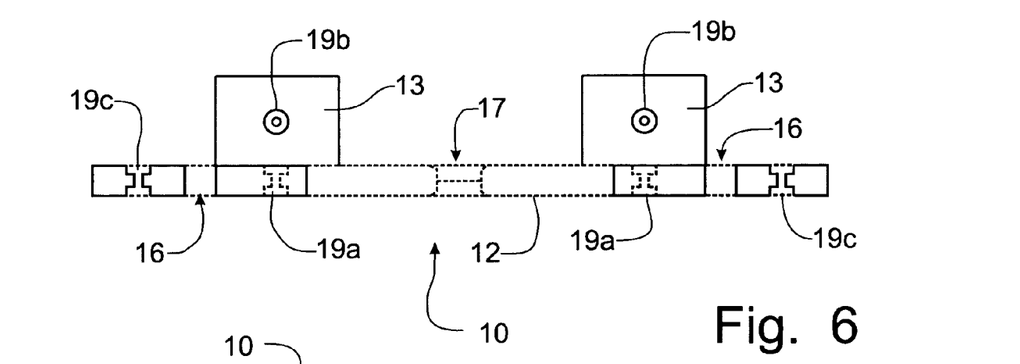
FIG. 6 is a cross-sectional view of the panel member taken along lines 6-6 in FIG. 2.

Preferably, each of the fastener openings 19 are formed with recessed portions, best seen in FIGS. 5 and 6, to allow fastener heads and nuts to be recessed into the body portion 12 so that these fasteners do not project outwardly for engagement with animals, such as horses, using the feeder assemblies. One skilled in the art will recognize the certain fasteners, such as carriage bolts, will have a rounded head that can be located on the outside of a panel member 10. Thus, the fastener openings 19 could be formed with a recess on only one side thereof to recess the nut threaded onto the carriage bolt, provided that internal structure is provided to engage the carriage bolt properly to permit tightening thereof.

To facilitate assembly of the feeder structures, as described in greater detail below, the distance the connection members 13 project from the body portion 12 is greater than the distance the insertion members 15 project from the body portion 12. This configuration enables a fastener to be inserted through the opening 19b in a connection member 13 of a panel member 10 oriented as a floor member and through an aligned opening 19c in the insertion member 15 of a vertically oriented panel member 10 forming a wall member so that the joined insertion member 15 and connection member 13 will form a ground support leg, while the insertion members 15 of the panel member 10 serving as the floor member can extend through the insertion openings 16 of yet another panel member 10 forming another wall member for the feeder structure. Accordingly, the difference in the length of the connection member 13 versus the insertion member 15 would be the distance from the insertion opening 16 to the edge of the body portion 12.

Figure 8:
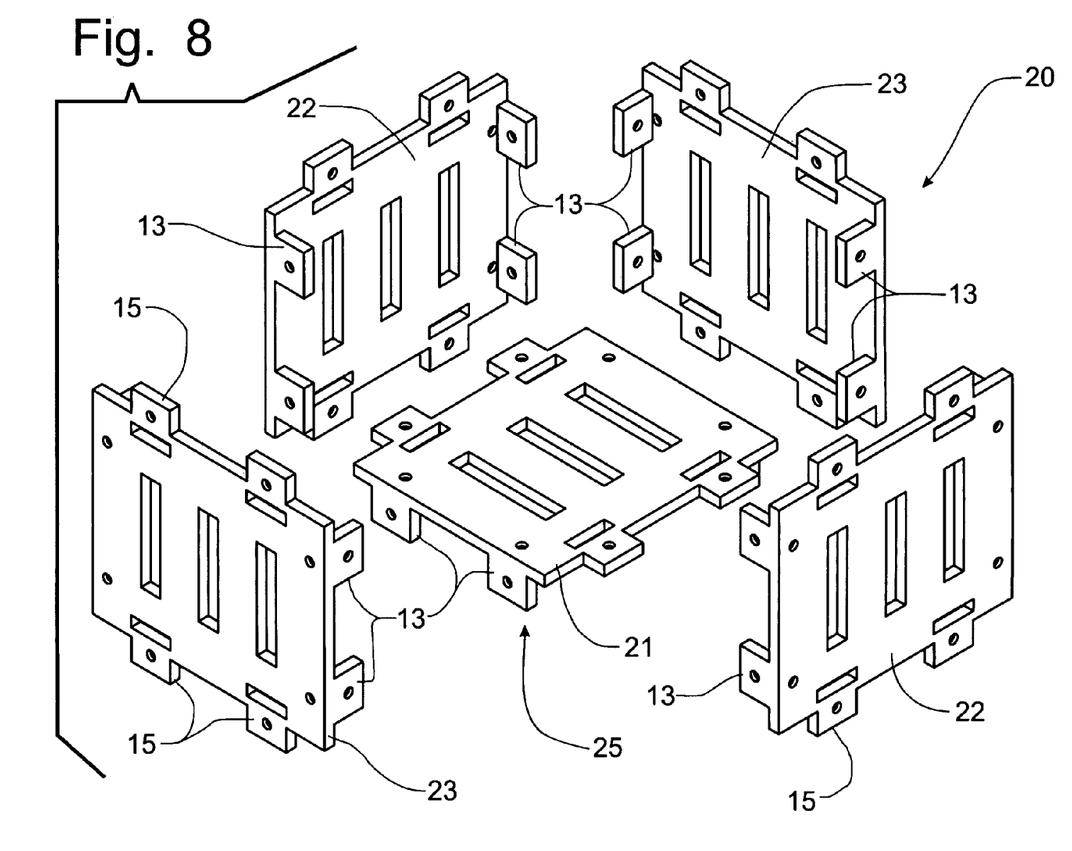
FIG. 8 is an exploded view of a 1×1 feeder assembly formed by five of the panel members.
Figure 9:
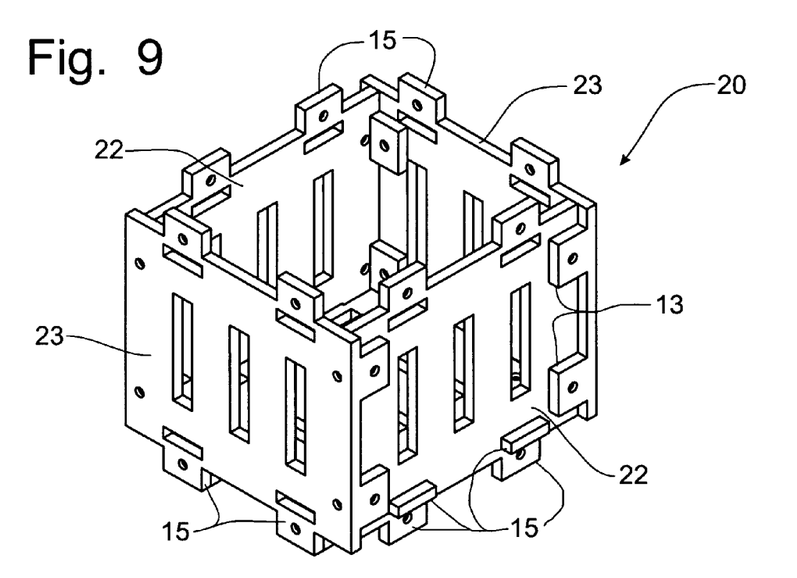
FIG. 9 is a perspective view of the 1×1 feeder assembly shown in FIG. 9.
Figure 10:
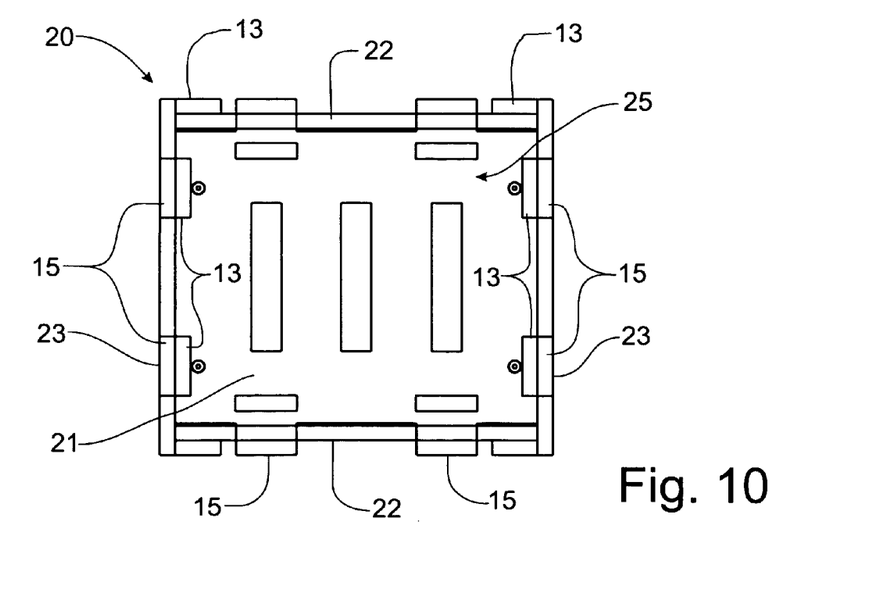
FIG. 10 is a bottom plan view of the 1×1 feeder assembly shown in FIG. 10.
Figure 11:
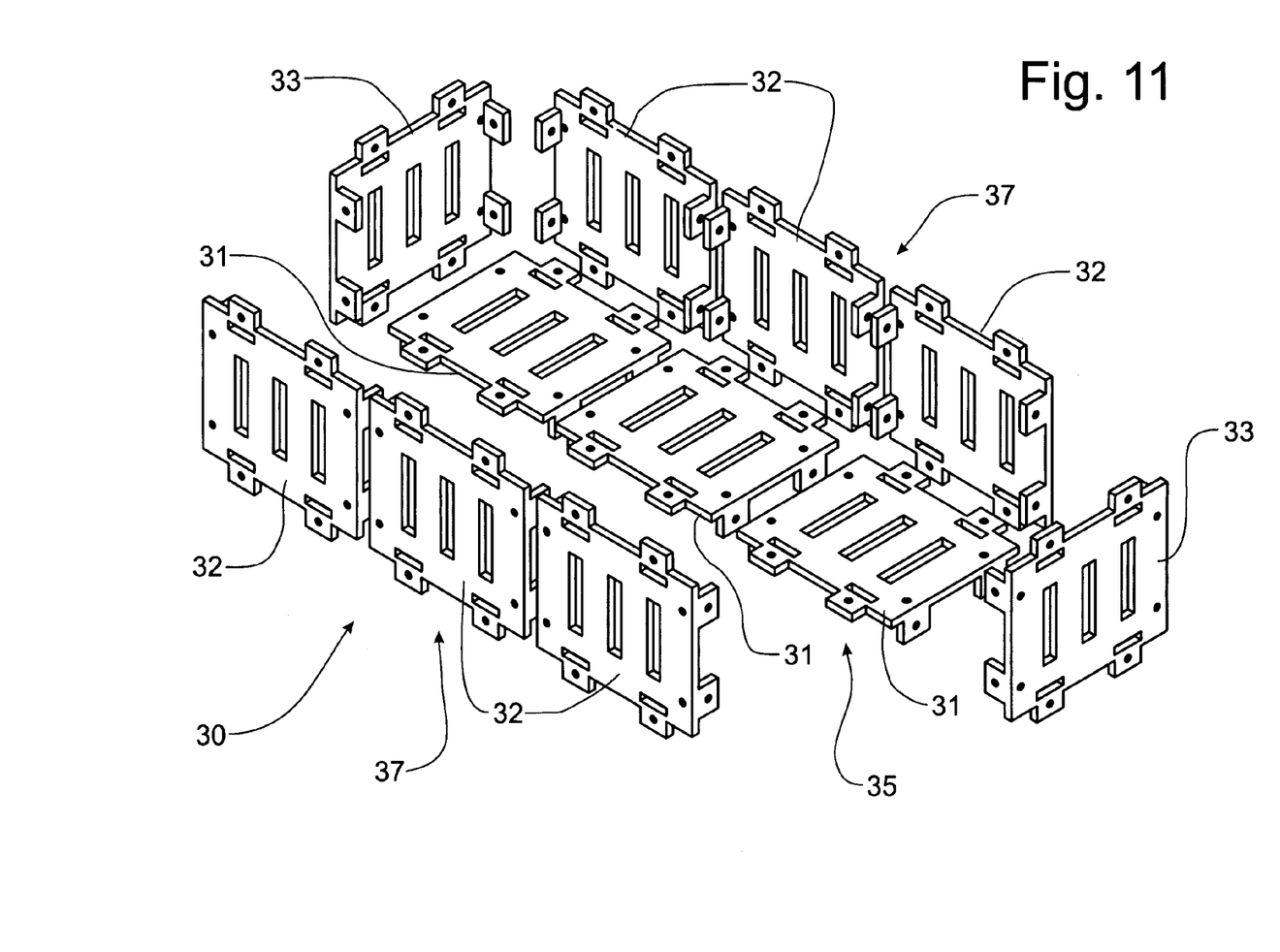
FIG. 11 is an exploded view of a 1×3 feeder assembly formed by eleven of the panel members.

The assembly of five of the panel members 10 into a 1×1 feeder assembly 20 is depicted in FIGS. 8-10. One of the panel members 21 is oriented generally horizontally with the planar side facing upwardly to position the connection members 13 downwardly to serve as ground engaging legs. Two more (second) panel members 22 are oriented in an upright manner such that the insertion members 15 thereof extend upwardly and downwardly with the downwardly extending insertion members 15 also becoming ground engaging legs on opposite sides of the first panel member 21 from the connecting members 13. The two second panel members 22 are pressed onto the first panel member 21 so that the insertion members 15 of the first panel member 21 are received in the lowermost insertion slots 16 of the second panel members 22.

Two additional upright (third) panel members 10 are then located on the remaining sides of the first panel member 21 in an orientation that places the insertion members 15 in a vertically extending orientation. The lowermost insertion members 15 of the third panel members 23 are located adjacent the connection members 13 of the first panel member 21 so that fasteners can be inserted through aligned fastener openings 19b, 19c to join the third panel members 23 to the first panel member 21. The positioning of the second panel members 22 onto the insertion members 15 of the first panel member 21 locates the second panel members 22 closer by a distance equal to the depth of the body portion 12 than the spacing of the third panel members 23.

Thus, the connection members 13 of the third panel members 23 will be located on the outside of the second panel members 22 at a position where the fastener openings 19b in the connection members 13 of the third panel members 23 will align with the fastener openings 19a in the body portion 12 of the second panel members 22 so that fasteners can be inserted to join the second and third panel members 22, 23 together. The connection members 13 of the second panel members 22 will be located on the inside of the third panel members 23, but the fastener openings 19b therein will not be aligned with any other fastener openings. The end result is a feeder assembly 20 that is substantially a square box, as is depicted in FIGS. 9 and 10.

One skilled in the art will recognize that the use of the first panel member 21 as a floor 25 of the feeder assembly 20 will provide a more stable and more rigid feeder assembly 20, and will keep the crop material placed therein off the ground to minimize waste, however, the first panel member 21 could be eliminated from the feeder assembly 20 so that the joining of the second and third panel members 22, 23 forms a rectangular ground feeder ring that can be used to contain forage crop material in the field, particularly for horses.

Figure 12:
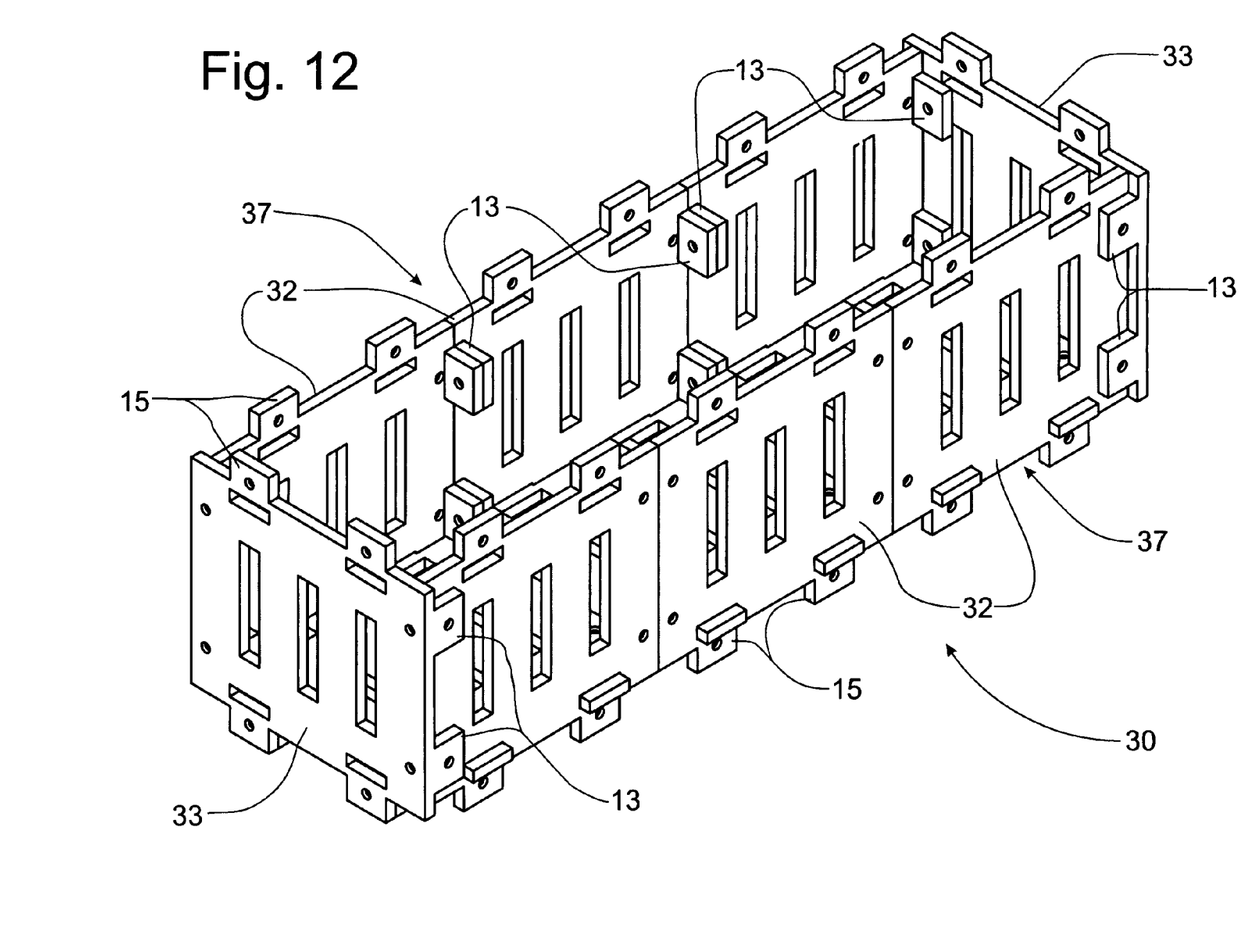
FIG. 12 is a perspective view of the 1×3 feeder assembly shown in FIG. 12.
Figure 13:
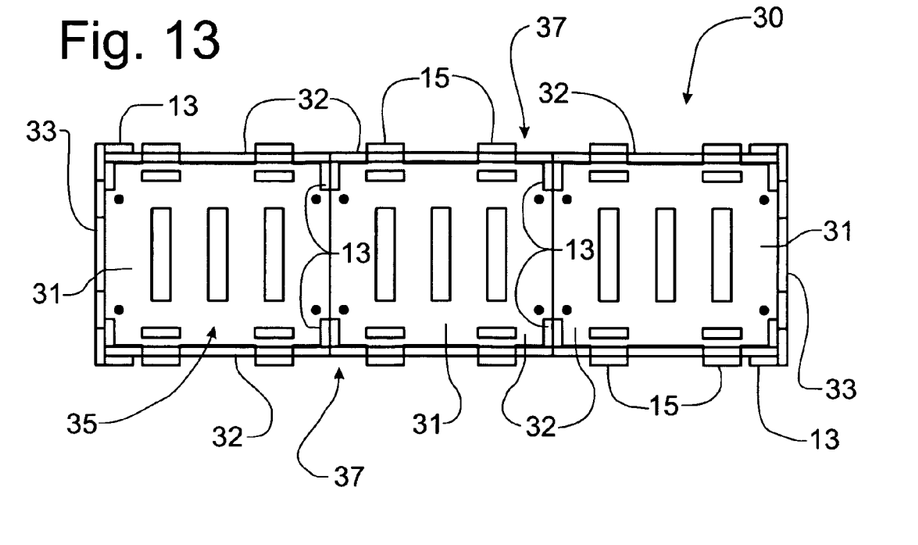
FIG. 13 is a top plan view of the 1×3 feeder assembly shown in FIG. 12.
Figure 14:
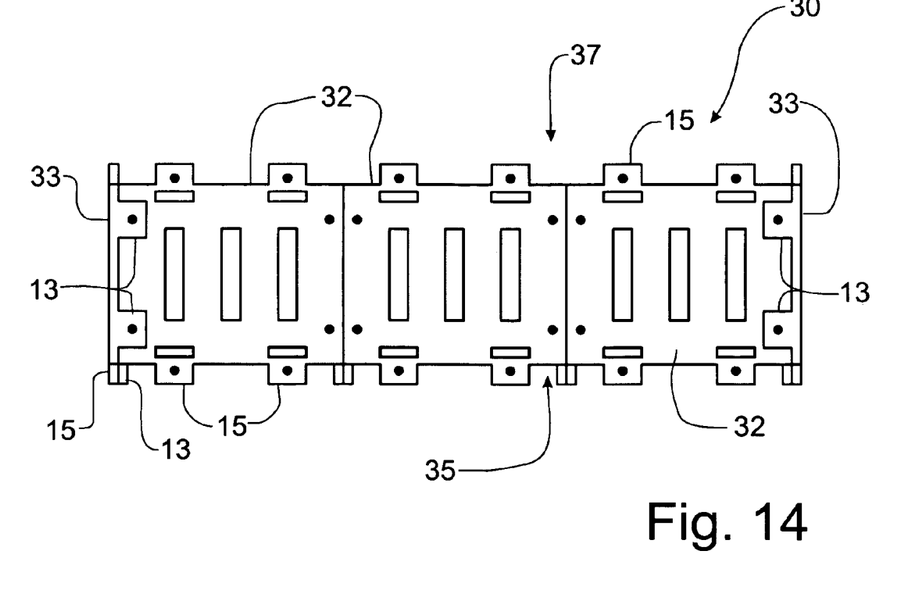
FIG. 14 is a side elevational view of the 1×3 feeder assembly shown in FIG. 13.

Other feeder assemblies are shown in FIGS. 12-20, including a 1×3 feeder assembly 30 in FIGS. 12-14 formed from eleven panel members 10. One skilled in the art will recognize that a 1×2 feeder assembly (not shown), or other configurations of feeder assemblies that are one panel wide and multiple panels long, could also be formed in a manner similar to that described below with respect to the 1×3 feeder assembly 30.

The 1×3 feeder assembly 30 is started with the placement of three first panel members 31 side by side, as indicated in FIG. 12. As with the 1×1 feeder assembly 20 described above, the first panel members 31 are placed with the planar side facing upwardly to locate the connection members 13 downwardly to serve as ground engaging legs. The center first panel 31 will have its connection members 13 located adjacent to the connection members 13 of the first panel members 31 on either side thereof. As a result, the fastener openings 19b will be aligned to allow a fastener to be inserted to join the three first panel members 31 together. Thus, the center of the floor portion 35 of the 1×3 feeder assembly 30 will be fully supported by ground engaging legs formed by adjoining connection members 13 on the first panel members 31.

Three of the second panel members 32 can then be placed onto the outwardly extending insertion members of the first panel members 31 on each side of the conjoined first panel members 31 to form the side portion 37 of the feeder panel 30. The central second panel member 32 of the two opposing groups of second panel members 32, like the center first panel member 31, are located such that the connection members 13 of the central second panel member 32 are located in alignment with the interior connection members 13 of the adjacent second panel members 32 so that a fastener can be inserted through the aligned fastener openings 19b to join the three second panel members 32 together on each opposing side of the first panel members 31. As with the 1×1 feeder assembly 20, the second panel members 32 are mount on the corresponding first panel members 31 so that the insertion members 15 of the first panel members 31 are received within the insertion slots 16 of the second panel members 32.

The end panel members 33 can then be mounted on the assembly 30 with the connection members 13 thereof located on the outside of the adjacent second panel members 32 so that fasteners can be inserted through the fastener openings 19b in the connection members 13 of the end panel members 33 aligned with the corresponding fastener openings 19a in the body portion 12 of the second panel members 32. The downwardly extending insertion members 15 of the end panel members 33 will also be located next to the outermost connection members 13 of the first panel members 31 so that fasteners can be inserted through the fastener openings 19c in the insertion members 15 of the end panel members 33 aligned with the fastener openings 19b in the outermost connection members 13 of the first panel members 31.

Accordingly, the 1×3 feeder assembly 30, as is shown in the perspective view of FIG. 12 and the top plan view of FIG. 13, forms a rectangular feeder assembly 30 that is one panel member 10 wide and three panel members 10 long to hold forage crop in the field for animals, such as horses. Such feeder assemblies 30 are particularly adapted for holding rectangular bales of hay, whether multiple small rectangular bales of hay are placed into the feeder assembly 30 and unbound for access by the animals to feed therefrom, or a large rectangular hay bale as are formed by specialty large square balers, particularly commercial hay growers.

Not all forage crops are baled in rectangular bales as round bales of hay are very popular in most areas of the country. The 1×1 or 1×3 feeder assemblies 20, 30 described above are not wide enough to receive most large round bales of hay. Accordingly, the panel members 10 can be formed into larger feeder assemblies, such as a 2×2 feeder assembly (not shown) or a 2×3 feeder assembly 40, which is depicted in FIGS. 15-20. One skilled in the art will recognized that any configuration of a feeder assembly that is two panel members 10 wide and multiple panel members 10 long will be formed in substantially the same manner as will be described in greater detail below with respect to the 2×3 feeder assembly 40 shown in FIGS. 15-20.

Figure 15:
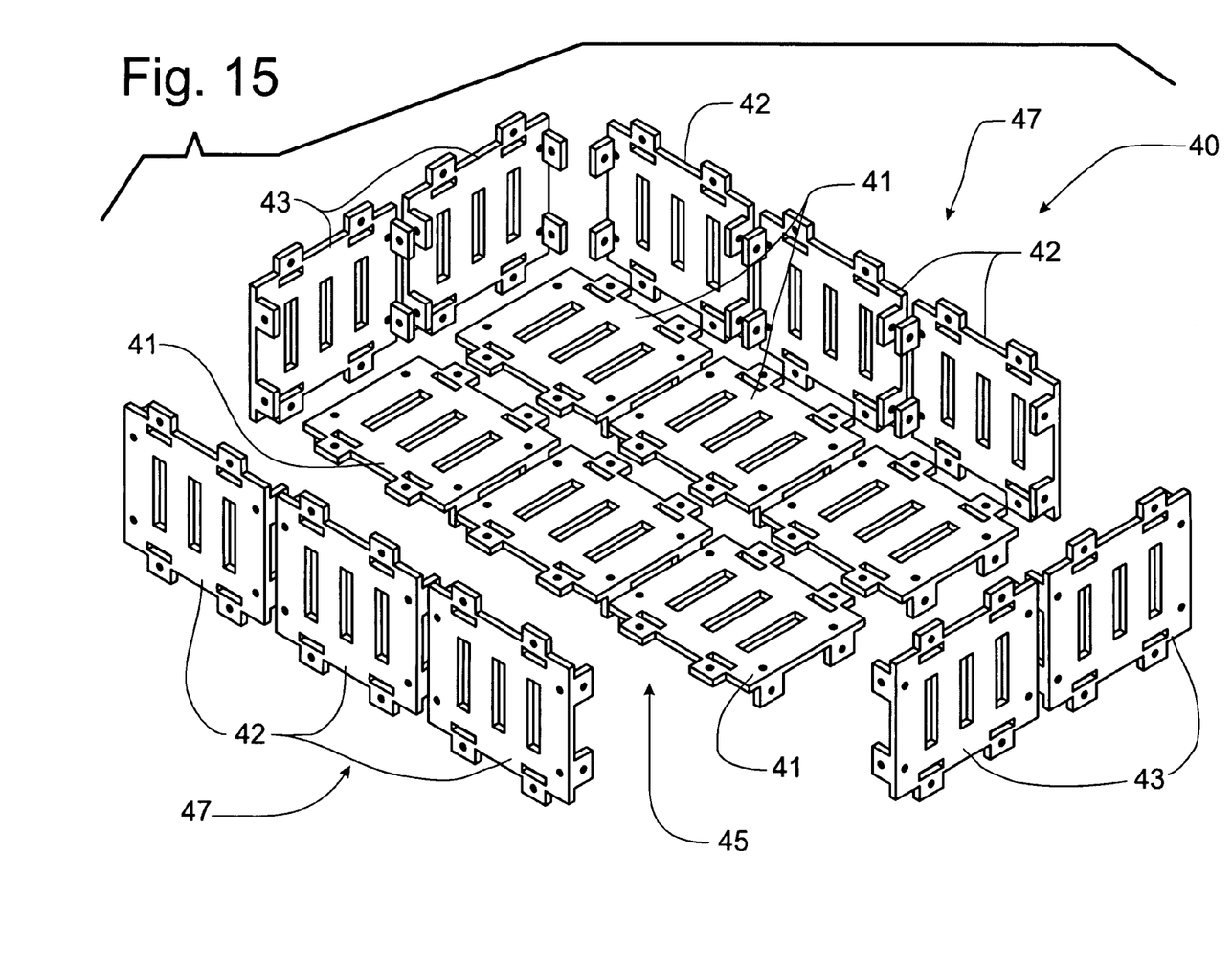
FIG. 15 is an exploded view of a 2×3 feeder assembly formed by sixteen of the panel member.
Figure 16:
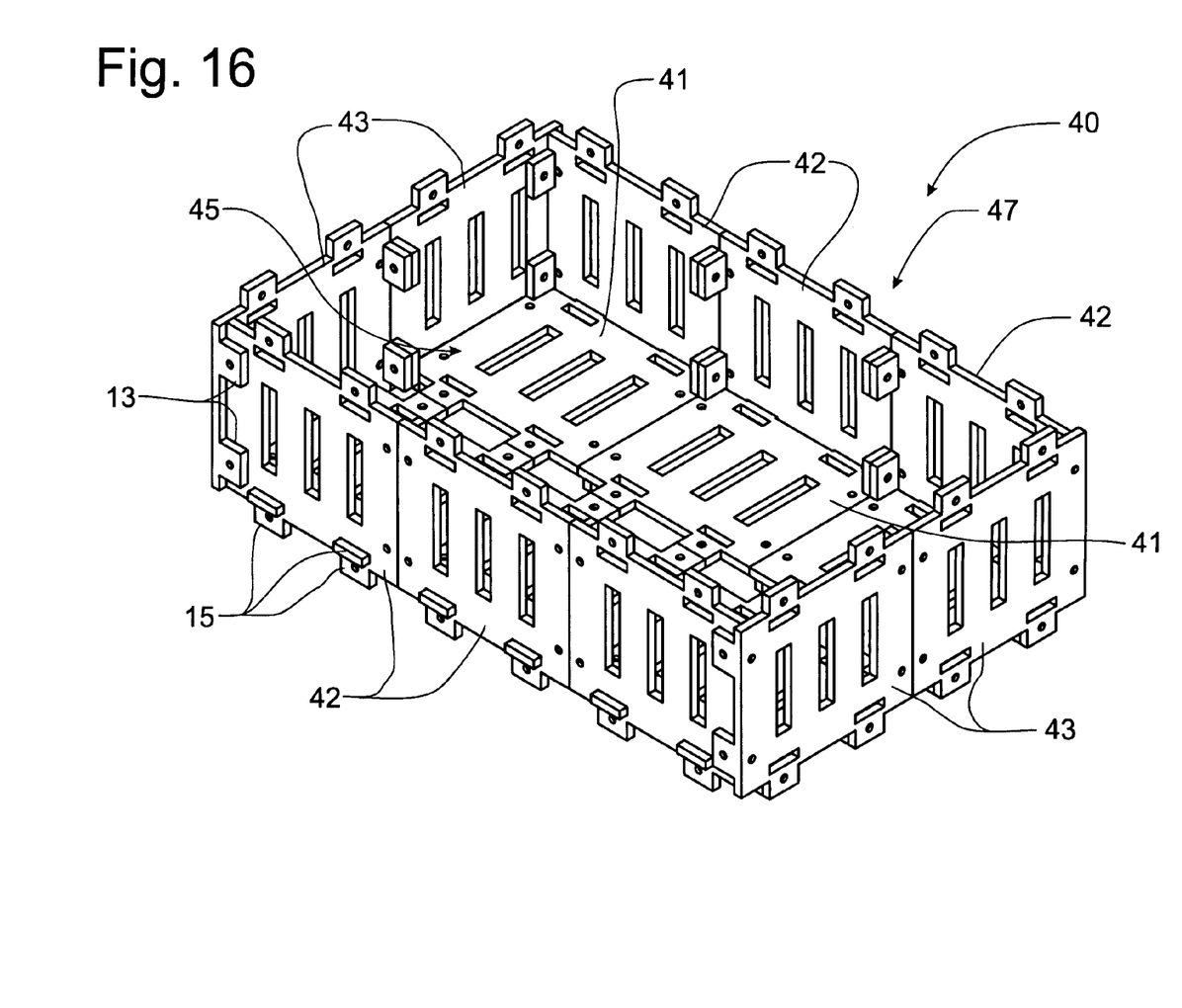
FIG. 16 is a perspective view of the 2×3 feeder assembly shown in FIG. 15.
Figure 17:
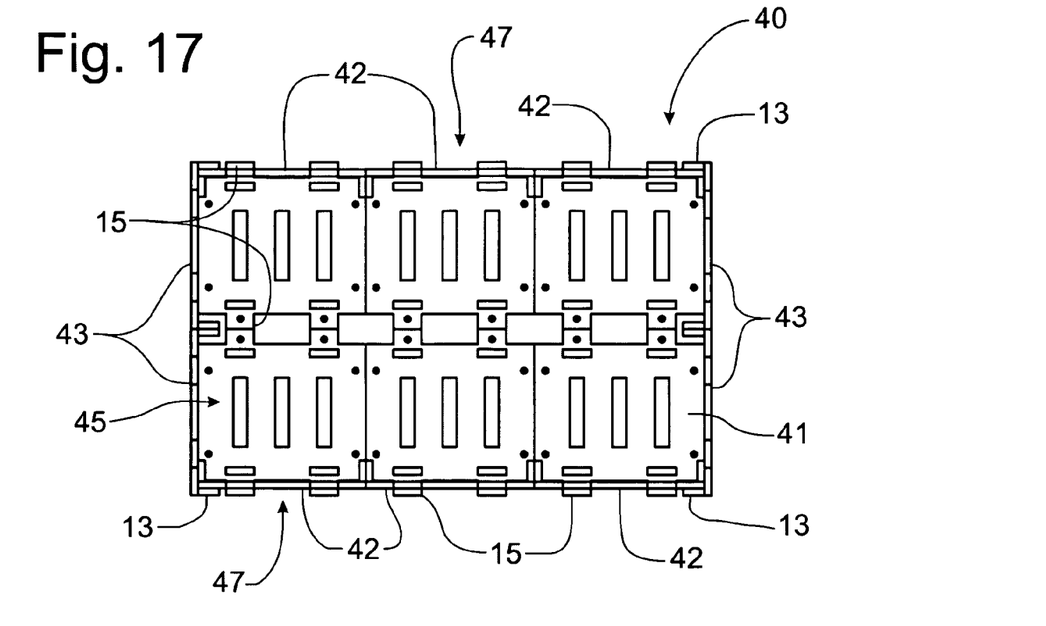
FIG. 17 is a top plan view of the 2×3 feeder assembly shown in FIG. 16.
Figure 18:
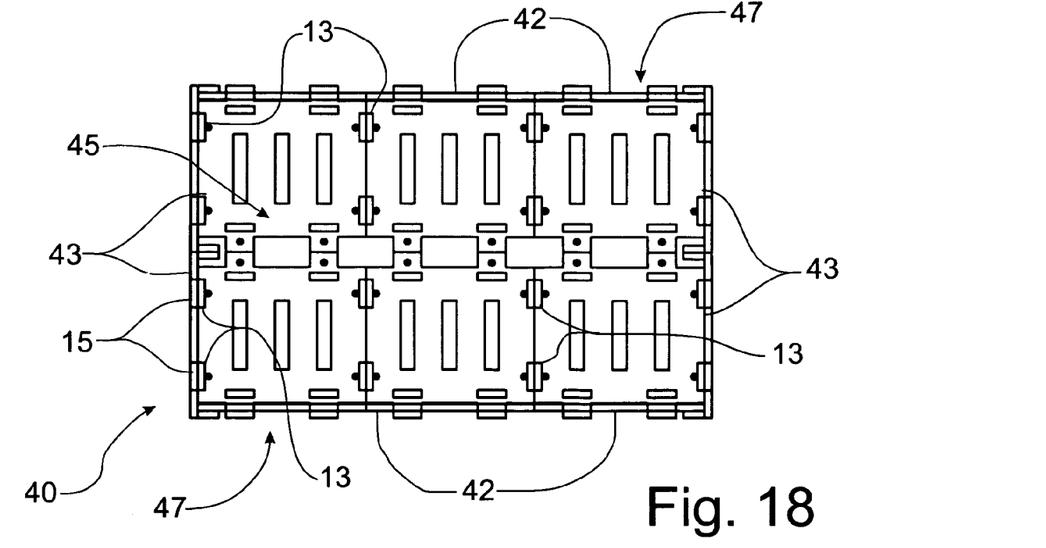
FIG. 18 is a bottom plan view of the 2×3 feeder assembly shown in FIG. 16.
Figure 19:
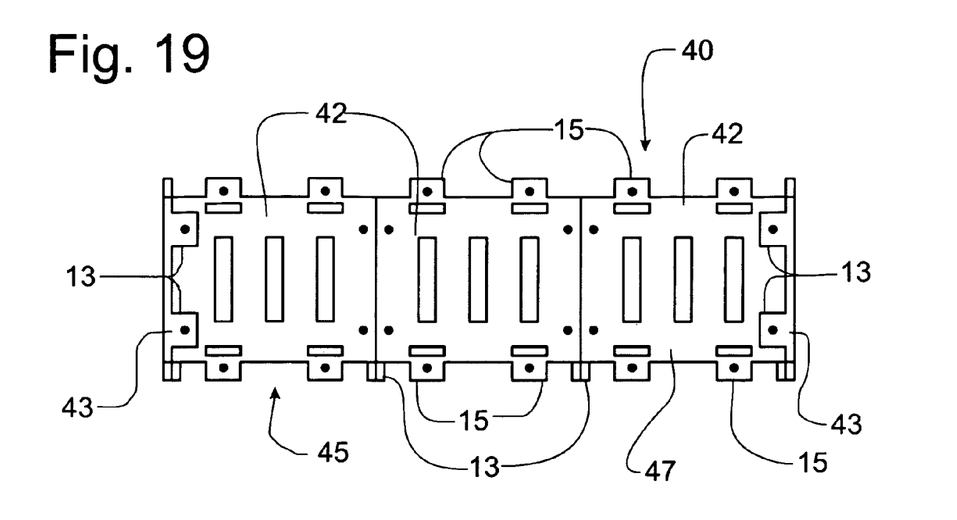
FIG. 19 is a side elevational view corresponding to the long side of the 2×3 feeder assembly shown in FIG. 17.
Figure 20:
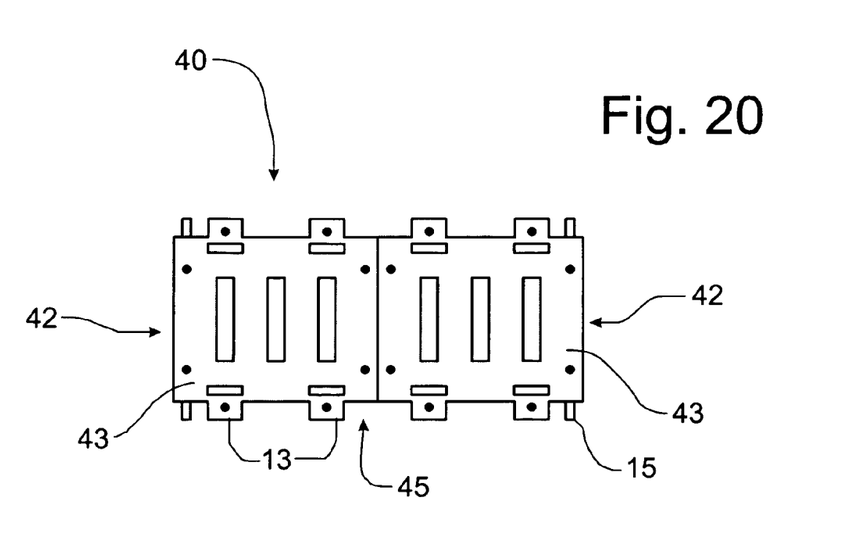
FIG. 20 is a side elevational view corresponding to the short side of the 2×3 feeder assembly shown in FIG. 17.

The 2×3 feeder assembly 40 is formed by sixteen panel members 10 arranged in six first panel members 41 that form the floor portion 45 of the feeder assembly 40, six second panel members 42 that are mounted on the insertion members 15 of the first panel members 41, as is amply described above with respect to both the 1×1 and 1×3 feeder assemblies 20, 30, and four end panel members 43. The primary difference between the formation of the floor portion 45 of the 2×3 feeder assembly 40 and the formation of the floor portion 35 of the 1×3 feeder assembly 30 described above, is that there are two groups of three first feeder panels 41 arranged side by side to define the floor portion 45.

While each group of three first panel members 41 are interconnected by fasteners joining the downwardly extending connection members of the center first panel member 41 to the interior connection members 13 of the adjacent first panel members, the two groupings of first panel members 41 have no interlocking structure to join them together. The inwardly directed insertion members 15 of the two groupings of first panel members 41 are located immediately adjacent to one another, end to end. Accordingly, a U-bolt can be passed through the fastener openings 19c of the opposing inwardly directed insertion members to join the two groupings of first panel members 41 to form the floor portion 45.

The side portions 47 of the 2×3 feeder assembly 40 are formed identically to that described above with respect to the side portions 37 of the 1×3 feeder assembly 30. The second panel members 42 are joined together by fasteners and mounted on the corresponding grouping of first panel members 41 so that the insertion members 15 thereof are received within the insertion slots 16 of the second panel members 42. The end panel members 43 are formed somewhat differently as the two end panel members 43 are each end of the feeder assembly 40 are joined together by fasteners inserted through aligned fastener openings 19b of the adjacent interior connection members 13. The end panel members 43 are then joined to the second panel members 42 as is described above with respect to the 1×3 feeder assembly 30.

The end result is a square or rectangular feeder assembly 40, depending on whether the feeder assembly 40 is formed two panel members 10 long or more. The double wide feeder assembly 40 is sufficiently large to receive a large round bale of hay or multiple rectangular bales of hay for presentation to animals for feeding, particularly in the field.

The generally square shaped panel member 10 is easily packaged for shipment to customers from a manufacturing site, particularly if packaged in pairs. The connection members 13 of one panel member 10 will be turned to rest against the insertion members 15 of the other panel member 10 of the pair to present a square shipping package that is about three panel thicknesses deep. Once in the hands of the customer, the panel members can be transported into the field in a disassembled state stacked on a trailer where the feeder assembly 20, 30, 40 can be assembly on site. If a floor portion is not utilized, the side portions of the feeder assemblies can be used as a ground feeder ring that is placed around the forage crop to be fed. Such a ground feeder ring can be assembled around the bale(s) of hay to be fed or assembled remotely therefrom and placed over the bales to be fed therefrom.

Assembly of the feeder assemblies 20, 30, 40 can be accomplished easily in the field by the proper positioning of the respective panel members 10 and the placement of fasteners between aligned fastener openings 19. Disassembly of the feeder assemblies 20, 30, 40 can also be accomplished in the field with ease by simply removing the fasteners and disengaging the panel members 10 to permit an easy and convenient transportation of the panel members into remote storage or to another field location for re-assembly.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A plastic universal panel member for forming feeder structures for the feeding of forage material to animals, comprising:
 a body portion formed in a hollow, double-walled configuration and defining a plane having a first pair of opposing sides and a second pair of opposing sides, said body portion also having a thickness dimension, said body portion including insertion openings extending through said body portion corresponding to said thickness dimension;
 a pair of insertion legs extending within said plane from said body portion at each said side of said first pair of opposing sides of said body portion, said insertion legs being sized to pass through said insertion openings, each said insertion leg having a length dimension measured from said body portion that is greater than said thickness dimension of said body portion; and a pair of connecting legs extending perpendicularly to said plane from said body portion at each said side of said second pair of opposing sides of said body portion, each said connecting leg having a length dimension substantially equal to said length dimension of said insertion legs.

2. The panel member of claim 1 wherein said insertion legs and said connecting legs project from said main body portion a distance at least as great as said thickness dimension.

3. The panel member of claim 1 wherein each said connecting leg is formed with a fastener opening therethrough, said main body portion being formed with fastener openings therethrough in locations that would align with the fastener openings in said connecting legs of a perpendicularly oriented panel member.

4. The panel member of claim 3 wherein each said insertion leg is formed with a fastener opening extending therethrough, said fastener opening in said insertion legs being alignable with the fastener openings in said connecting legs to allow a fastener to extend therethrough to connect two perpendicularly oriented panel members.

5. The panel member of claim 4 wherein said insertion openings are formed in said body portion in alignment with said insertion legs.

6. The panel member of claim 5 wherein said insertion legs project a first distance from said body portion and said connection legs project a second distance from said body portion, said second distance being greater than said first distance.

7. The panel member of claim 4 wherein said insertion legs of a first vertically oriented panel member are connectable to said connection legs of a second horizontally oriented panel member through a fastener passing through aligned respective fastener openings to form a ground support leg for a feeder structure of which said first panel member forms a portion of an upright wall and said second panel member forms at least a portion of a floor.

8. The panel member of claim 7 wherein a third vertically oriented panel member is connected to said second panel member by two of said insertion legs of said second panel member being received into corresponding said insertion openings of said third panel member, two of said connecting legs of said third panel member being secured to said first panel member by fasteners extending through fastener openings in said connecting legs and through corresponding fastener openings in said body portion.

9. The panel member of claim 8 wherein said body portion is formed with strengthening features, including one of openings passing therethrough and kiss-offs.

10. A feeder structure for feeding forage material to animals comprising a plurality of generally rectangular panel members joined together to form a floor and an upright wall extending around a periphery of said floor, each said panel member having a body portion defining a plane having a first pair of opposing sides and a second pair of opposing sides, said body portion also having a thickness dimension; a pair of insertion legs extending within said plane from said first pair of opposing sides of said body portion; a pair of connecting legs extending perpendicularly to said plane from said second pair of opposing sides of said body portion; a pair of insertion openings formed in said body portion at each said first pair of opposing sides; and fastener openings formed in said body portion and in each said connecting leg and each said insertion leg, wherein:

a pair of first panel members are oriented vertically to form a portion of said upright wall with said insertion legs extending vertically above and below the corresponding said body portion;

a second panel member formed identically to said first panel member is oriented horizontally to form at least a portion of said floor with said connection legs extending vertically downwardly from said body portion, two of said connection legs of said second panel member being joined to said insertion legs extending below the body portion of each of said first panel member by fasteners, the first panel members being located on opposing sides of said second panel member; and a pair of third panel members formed identically to said first panel members oriented vertically to form a portion of said upright wall extending perpendicularly to said first panel members on opposing sides of said second panel member with said insertion legs of said third panel members extending above and below the corresponding said body portion, two of said insertion legs of the second panel member being received within a corresponding pair of said insertion openings in each respective said third panel member, two of said connecting legs of said third panel member being connected to said body portion of said first panel member by fasteners extending through aligned fastener openings.

11. The feeder structure of claim 10 wherein each said panel member has said insertion openings formed in said body portion in alignment with said insertion legs.

12. The feeder structure of claim 10 wherein each said panel member has said insertion legs project a first distance from said body portion and said connection legs project a second distance from said body portion, said second distance being greater than said first distance.

13. The feeder structure of claim 12 wherein said first distance is at least as great as said thickness dimension.

14. The feeder structure of claim 10 further wherein a fourth panel member is oriented vertically and generally parallel to said third panel member, said fourth panel member being connected to said second panel member by insertion legs of a floor panel member extending through corresponding lower insertion openings in said fourth panel member.

15. The feeder structure of claim 14 wherein said floor is formed by multiple horizontally oriented panel members joined together by connecting adjacent respective connecting legs with fasteners, said walls having said third and fourth panel members therein being formed by multiple panel members connected in a linear fashion by connecting adjacent connecting legs with fasteners, each of side wall panel members receiving insertion legs of a corresponding said floor panel member.

16. The feeder structure of claim 15 wherein said floor is formed by multiple rows of horizontally oriented panel members, the horizontally extending insertion legs of the panel member in one row of horizontally oriented panel members being connected to the adjacent horizontally extending insertion legs of the panel members in adjacent row of panel members by fastener devices that extending between the fastener openings of the adjacent respective insertion legs.

17. A method of creating a feeder structure for holding forage material for feeding by animals comprising the steps of:

providing a plurality of generally rectangular universal panel members formed identically, each of said panel members having a body portion defining a plane having a first pair of opposing sides and a second pair of opposing sides, said body portion also having a thickness dimension; a pair of insertion legs extending within said plane from said body portion at each side of said first pair of opposing sides of said body portion, each said insertion leg having a length dimension greater than said thickness dimension; a pair of connecting legs extending perpendicularly to said plane from said body portion at each side of said second pair of opposing sides of said body portion, each said connecting leg having a length dimension substantially equal to the length dimension of said insertion legs; a pair of insertion openings formed in said body portion at each said first pair of opposing sides, said insertion openings being in alignment with corresponding said insertion legs; and fastener openings formed in said body portion and in each said connecting leg and each said insertion leg;

creating a floor from at least one of said panel members oriented horizontally with said connecting legs extending downwardly from said body portion and said insertion legs extending horizontally from said body portion; and forming a wall around a periphery of said floor by joining vertically oriented panel members to said at least one panel member forming said floor with said insertion legs extending above and below said body portion, said vertical panel members positioned adjacent the connecting legs of said at least one horizontal panel member being connected thereto by fasteners extending through aligned fastener openings in the lower insertion legs of the vertical panel member and the adjacent connecting legs of the horizontal panel member, said vertical panel members positioned adjacent the insertion legs of said at least one horizontal panel member being connected thereto by said insertion legs of the horizontal panel member being received into the insertion openings of the adjacent vertical panel member.

18. The method of claim 17 wherein said creating step includes connecting multiple horizontally oriented panel members into a linearly extending row by securing adjacent connecting legs with fasteners.

19. The method of claim 18 wherein said creating step forms multiple rows of horizontally oriented panel members, each row being connected to the adjacent row by a fastening device interconnecting the fastener openings in adjoining insertion members.

* * * * *